United States Patent
Stieler

(12) 
(10) Patent No.: US 6,733,047 B1
(45) Date of Patent: May 11, 2004

(54) QUICK CONNECTOR FOR FUEL/VAPOR APPLICATIONS

(75) Inventor: David C. Stieler, Lake Orion, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/401,159

(22) Filed: Sep. 22, 1999

(51) Int. Cl.$^7$ .................................................. F16L 21/08
(52) U.S. Cl. ........................................ 285/319; 285/21.1
(58) Field of Search ................................ 285/319, 21.1

(56) References Cited

U.S. PATENT DOCUMENTS

| | | |
|---|---|---|
| 3,980,248 A | 9/1976 | Minoshima |
| 4,589,684 A | 5/1986 | Nowacki et al. |
| 4,844,512 A | 7/1989 | Gahwiler |
| 5,201,549 A | 4/1993 | Davey |
| 5,248,168 A * | 9/1993 | Chichester et al. ...... 285/319 X |
| 5,261,709 A * | 11/1993 | McNaughton et al. ...... 285/319 |
| 5,332,269 A | 7/1994 | Homm |
| 5,462,313 A | 10/1995 | Rea et al. |
| 5,472,754 A | 12/1995 | Douchet et al. |
| 5,568,946 A | 10/1996 | Jackowski |
| 5,573,279 A * | 11/1996 | Rea et al. ................ 285/319 X |
| 5,590,691 A | 1/1997 | Iorio et al. |
| 5,626,371 A | 5/1997 | Bartholomew |
| 5,636,875 A | 6/1997 | Wasser |
| 5,782,508 A * | 7/1998 | Bartholomew ............. 285/319 |
| 5,794,984 A * | 8/1998 | Bartholomew .......... 285/319 X |
| 5,823,508 A | 10/1998 | Nie |
| 5,873,610 A | 2/1999 | Szabo |
| 5,923,819 A * | 7/1999 | Ross et al. .................. 392/441 |
| 5,941,422 A * | 8/1999 | Struble ........................ 222/109 |
| 6,186,561 B1 * | 2/2001 | Kaishio et al. ............. 285/319 |
| 6,199,916 B1 * | 3/2001 | Klinger et al. .......... 285/319 X |

FOREIGN PATENT DOCUMENTS

| | | |
|---|---|---|
| DE | 39 03 551 | 2/1989 |
| FR | 2 737 548 | 2/1997 |
| JP | 62 9937 | 1/1987 |
| NL | 7011090 | 7/1970 |
| WO | WO 94/15137 | 7/1994 |
| WO | WO 97/17188 | 5/1997 |

* cited by examiner

Primary Examiner—Lynne H. Browne
Assistant Examiner—David E. Bochna
(74) Attorney, Agent, or Firm—Young & Basile, P.C.

(57) ABSTRACT

A quick connector apparatus and method of forming same includes a retainer element having a first end portion spin welded to an inner surface of a bore formed in an end portion of a first conduit after a sealing element has been mounted in the end portion of the first conduit. The retainer element includes a movable latch member projecting from the second end which is engagable with an enlarged annular flange on the second conduit to releasably interconnect the second conduit and the retainer; while at the same time providing sealing between the second conduit and the first conduit via engagement between the internally mounted sealing element and the retainer element.

12 Claims, 3 Drawing Sheets

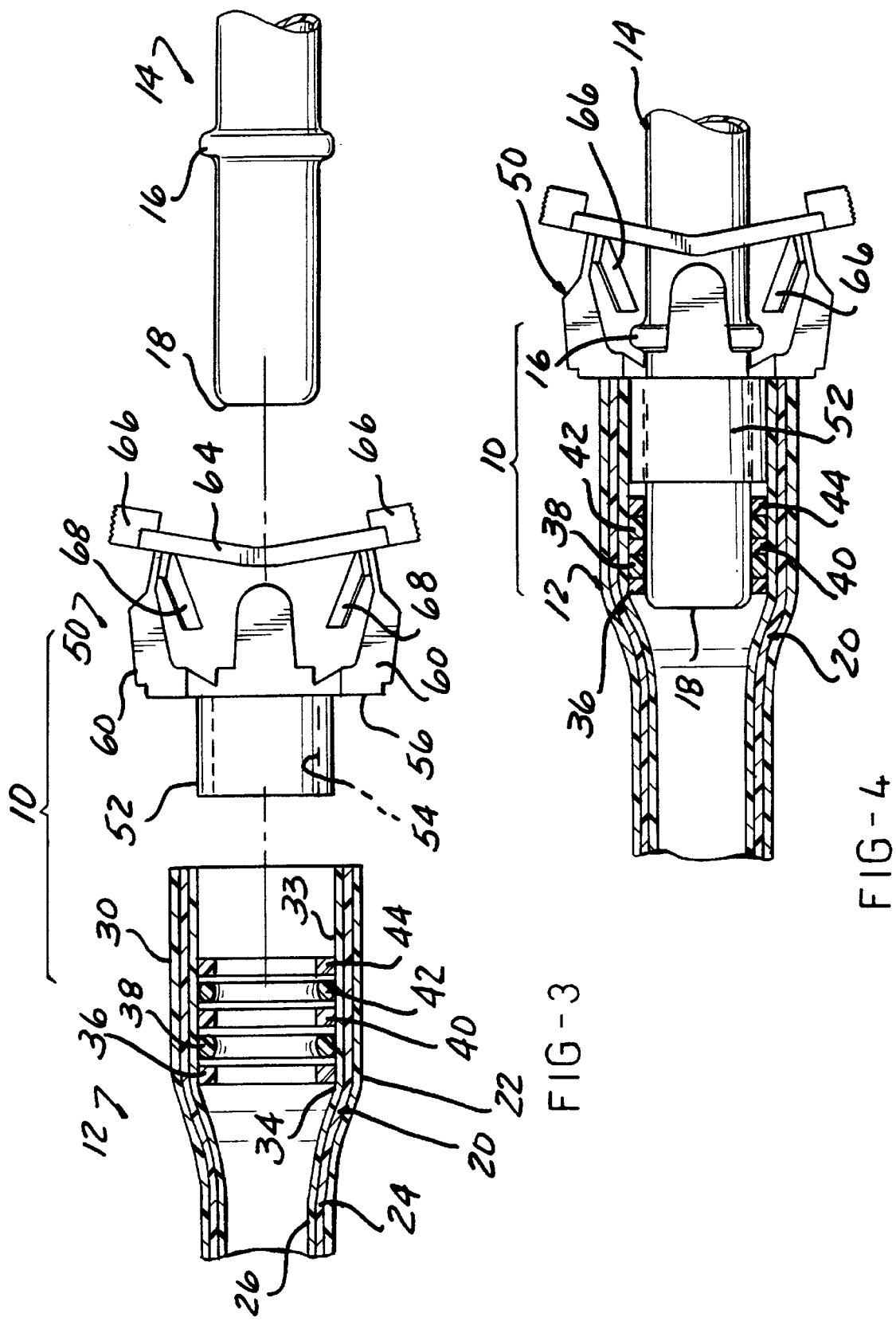

QUICK CONNECTOR FOR FUEL/VAPOR APPLICATIONS

BACKGROUND OF THE INVENTION

1. Field of the Invention

The present invention relates to fluid connectors and, specifically, to the sealing interconnection of such connectors with tubing end forms and, more specifically, to the use of spin welding to effect such interconnection.

2. Description of the Art

Quick connect couplings have been widely used in the U.S. Automobile industry for many years. Although applicable in numerous applications, quick connectors are typically employed in fuel systems and vapor recovery systems. The simplest and most cost effective design is the plastic housing female type quick connector releasably mated to a metal or plastic male tube endform. The opposite end of the female housing most typically defines a stem having a number of axially spaced barbs formed on the outer circumferential surface thereof and a nylon or plastic tubing endform pressed thereover.

In fluid handling systems, it is imperative that the connectors used have their male and female portions properly coupled together. A faulty connector enables an associated system to leak fluid or vapor. This can be particularly disadvantageous when the system is under pressure and the leaking connector expels the pressurized fluid. Furthermore, recent federal legislation has mandated significantly reduced hydrocarbon emissions from automotive fuel and vapor recovery systems. Conventional quick connectors, although effective to mechanically maintain tubing endforms in assembly with their associated connector body, have not adequately addressed the federal requirements. Also, the materials employed, typically nylon 12, do not provide sufficient resistance to the permeation of hydrocarbons therethrough.

The permeation problem has been addressed in part through the development of co-extruded multi-layer plastic tube containing two or more discreet layers of different types of formulations of plastic, one of which is specifically designed to provide an effective permeation layer, blocking the escape of hydrocarbons from the system. In general, the most successful multi-layer tubing employs an outer layer composed of a material resistant to the exterior environment. An innermost layer is composed of a material which is chosen for its ability to block defusion of materials, such as hydrocarbons, alcohols and other materials present in fuel blends, to the outer layer and may have a degree of electrical conductivity sufficient to dissipate static charges generated by the flow of fluid therein. To date, it has been extremely difficult to obtain satisfactory lamination characteristics between dissimilar polymer layers. Thus, the use of one or more intermediate layers for bonding the inner and outer layers has been proposed.

The use of multi-layer tubing in fuel related applications has been problematic inasmuch as the tubing endform necessarily exposes the lamina ends of the inner and outer layers as well as any intermediate layers to either the system fuels and vapors or the equally harsh exterior environment. Such exposure tends to degrade the bonding between the various layers, causing delamination or separation of the layers, resulting in loss of system integrity, fuel contamination and even blockage of fluid flow.

A related problem stems from dual aspects of commercially available quick connect devices, to wit: high volume and low sale price frequently necessitating the use of inexpensive, somewhat pliable materials, and complex contours of extremely small inter-fitting components. These aspects collectively increase the likelihood of misassembly. High volume production techniques, including automated assembly tends to aggravate the problem wherein misassembly or impermissible dimensional variations of the components is difficult to detect. Excessive dimensional tolerance stack-up can result in low pull-apart characteristics between the barbed stem and the plastic tube and produce leakage. Misassembly, such as failure to include an O-ring on the barbed endform can result in leakage. In the case of multi-layer tube, dimensional and/or adhesive problems can result in mechanical delamination upon insertion of the tube over the barbed stem. Finally, mono-wall plastic tube or multi-layer structures with low hoop strength can relax over time or at elevated temperatures, resulting in leaking or weeping of fluid.

One prior art approach to address at least certain of these problems is shown in FIG. 1 wherein a quick connector assembly includes a connector which interconnects a steel tubing member endform with a mono-wall plastic tube endform. An upset bead displaced axially from the leading end of the steel tube releasably engages a retainer interconnected with the connector and is fluidically sealed thereto by a series of O-rings in the usual manner.

The opposite end of the connector is formed as an elongated stem or nipple having a plurality of axially spaced, radially outwardly projecting barbs. The plastic endform is slip fit over the outer surface of the nipple and engages the sharp edges of the barbs to mechanically engage the two elements, while an optional O-ring disposed within a radially outwardly opening recess provides a seal between the internal diameter of the plastic endform and the connector.

In order to address certain problems with this prior art design, another quick connector developed by the assignee of the present application is in FIG. 2, also serves to interconnect a steel tubing member endform and a multi-layer plastic tube endform to effect a fluid seal therebetween ideally suited for use in automotive applications, particularly in fuel and vapor applications.

This prior art connector is formed of a hard shell plastic connector body having a stepped bore which receives one end of the male endform at one end. A retainer is releasably mountable in the connector body in engagement with the raised annular flange on the male endform to releasably interconnect the male endform and the connector body.

The rigid plastic tube has an end seated within a specially formed, annular groove in the end of the connector body and spun welded thereto to form an environmentally favorable seal between the two elements as well as to physically join the two elements together.

While the second prior art connector overcomes many disadvantages associated with the earlier prior art connector shown in FIG. 1, the connector assembly shown in FIG. 2 includes a complex connector housing with an internal stepped bore sized in various diameters to receive the sealing elements as well as the male endform and a separate retainer. In addition, the connector body uses the annular end groove specifically formed for the spin welded joint between the connector body and the rigid plastic tubing. Further, the spin welded tubing to quick connector joint is axially in front of the O-ring seal elements which can lead to a fuel/vapor leak if the weld is improperly formed or foils.

Thus, it would still be desirable to provide a simple and inexpensive, yet mechanically and environmentally robust connection between a tube endform and a connector body as well as a quick connector which overcomes the shortcomings of prior art connectors. It would also be desirable to provide a quick connector for use in vapor/fuel applications which uses a minimal number of components; yet is still able to provide the desired environmentally safe fluid seal between the metal male endform and the plastic tube.

SUMMARY OF THE INVENTION

The present invention is a quick connector apparatus ideally suited for fuel and vapor applications in automobiles.

One aspect of the present invention is a unique method of forming a quick connector. The method includes the steps of:
- inserting a seal member into an open end portion of the first tube member endform;
- providing a retainer element with a through bore extending between first and second opposed ends and at least one latch member extending from the first end;
- disposing the second end of the retainer element in the end portion of the first tube member endform;
- welding the end portion of the first tube member endform to the retainer element; and
- inserting a second tube member endform through the bore in the retainer element and into the end portion of the first tube member endform with the latch member on the retainer element engaging a radially enlarged flange on the second tube member endform to couple the second tube member endform to the retainer element.

In another aspect of the present invention, a quick connector apparatus includes:
- a first tube member having an end portion terminating at a first end;
- a seal member mounted in the end portion of the first tube member;
- a retainer element having a through bore extending between first and second opposed ends and at least one latch member extending from the first end with the second end of the retainer element inserted into a bore in end portion of the first tube member and spin welded to the first tube member; and
- a second tube member releasably coupled to the retainer element by the latch member.

In one aspect, the end portion of the first tube endform is expanded to an enlarged diameter from a nominal tube diameter. The seal element(s) are inserted into the enlarged diameter end portion.

The quick connector apparatus of the present invention overcomes several deficiencies found in previously devised quick connectors, including quick connectors utilizing spin welding to join various components of the connectors together, and quick connectors designed for specific use in fuel and vapor applications wherein it is necessary to limit fuel permeability through the conduits or tubes. The present quick connector utilizes a minimal number of components and eliminates the need for a complex, high cost housing employed in previous quick connector assemblies which is joined to one of the conduits and which receives the retainer element. The cylindrical sleeve of the retainer element and the inner surface of the open end portion of the conduit are spin welded together to form a gas impermeable seal therebetween. The welded conduit to quick connector housing joint is axially behind the O-ring seal(s) to reduce the possibility of a vapor fuel leak.

BRIEF DESCRIPTION OF THE DRAWINGS

The various features, advantages and other uses of the present invention will become more apparent by referring to the following detailed description and drawing in which:

FIG. 3 is an exploded, partially cross section, side elevational view showing the quick connector apparatus of the present invention;

FIG. 4 is a side elevational, assembled view of the quick connector according to the present invention; and, FIG. 5 is an enlarged perspective view of the retainer element depicted in FIGS. 3 and 4.

DESCRIPTION OF THE PREFERRED EMBODIMENT

Figure 1:
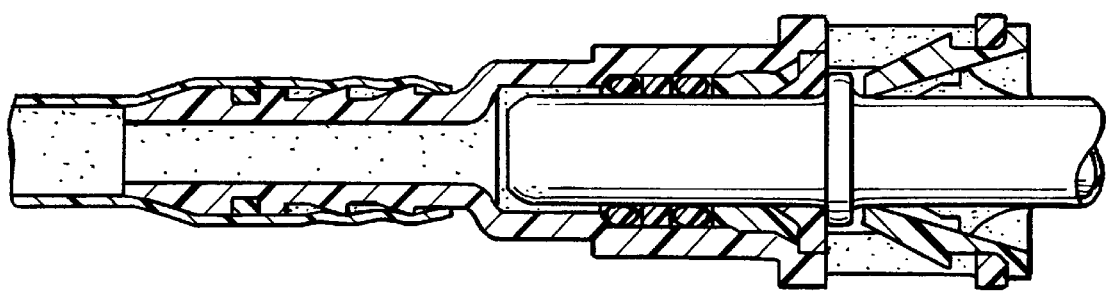
FIG. 1 is a cross-sectional view of a first prior art quick connector apparatus.
Figure 2:
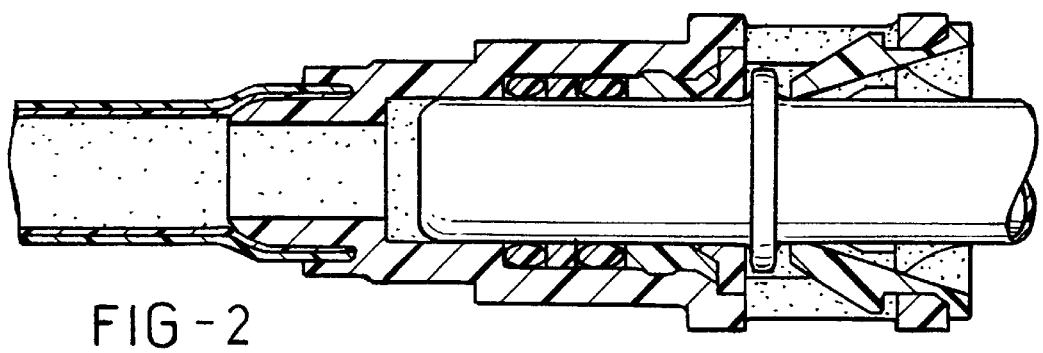
FIG. 2 is a cross-sectional view of a second prior art quick connector apparatus.

Referring now to FIG. 3, there is depicted a quick connector 10 constructed in accordance with the teachings of the present invention. In general, the quick connector apparatus 10, hereafter referred to as a quick connector, is configured for sealingly interconnecting a first tube member endform 12 and a second tube member endform 14.

By way of example only, the second tube member endform 14 is in the form of a fluid conduit typically formed of metal and impacted to form a radially outwardly protruding annular flange 16 which is spaced from one end 18. Alternately, the second tube member endform 14 may be formed of a plastic material with the annular flange 16 integrally formed thereon.

The first tube member endform 12 has a wall 20 made of at least one material, preferably a plastic material such as nylon, etc. Preferably, the wall 20 defines a multi-layer wall which may be fabricated by various methods, including co-extruding various compositions of thermoplastic materials in a conventional co-extrusion process. The wall 20 is preferably formed of a material which is suitable for use in motor vehicles and comprises a relatively thick outer layer 22 which is non-reactive with the external environment and can withstand various shocks, vibrational fatigue, and changes in temperature as well as exposure to various corrosive and degrading compounds to which it would be exposed through the normal course of operation in the motor vehicle. Suitable materials for use in the forming the wall 20 may include any melt-processible extrudable thermoplastic material which is resistant to ultra-violet degradation, extreme changes in heat and exposure to gasoline and its additives. The material of choice may also exhibit resistance to environmental hazards such as exposure to zinc chloride, and resistance to degradation upon contact with material such as engine oil and brake fluid. Inner and outer layers 24 and 22, respectively, are preferably formed of suitable material, such as nylon 12, which is compatible with the material selected for use in material forming the connector body. Furthermore, an intermediate layer 26 of the first tube endform 12 is formulated with graphite or other suitable material rendering it electrically conductive sufficient to dissipate electrostatic charge developed by fluid moving through the plastic first tube endform 12.

In addition, the inner layer 24 may be formed of various fluoropolymeric materials which are widely used in fuel lines in automobiles to limit gasoline permeation through the plastic wall or walls of the tubing. By way of example and not limitation, various tubing constructions suitable for use with the present invention are disclosed in U.S. Pat. Nos. 5,383,087 and 5,566,720.

As shown in FIGS. 3 and 4, the first tube member endform 12 has an open end portion formed to fixedly receive seal elements, such as an O-ring, spacer, etc., as described hereafter. In one aspect, the first tube endform 12 has a constant nominal diameter with an internal projection acting as a seat limiting insertion of the seal element. In another aspect, the first tube endform 12 has a radially expanded end portion 30 adjacent to one end 32. The enlarged portion 30 is formed by conventional tube forming processes. The enlarged end of portion 30 of the first tube member endform 12 forms an internal shoulder 34 at the tapered region between the expanded end portion 30 and the remainder of the nominal diameter first tubular member endform 12. The shoulder 34 acts as a stop for insertion of one end of the second tube member endform 14 into the expanded portion 30 of the first tube member endform 12 wherein the end 18 of the second tube member endform 14 abuts the internal shoulder 34, as shown in FIG. 4.

The inner diameter 33 of the expanded end portion 30 of the first tube member endform 12 is selected to receive not only the end portion 18 of the second tube member endform 14, but also one or more sealing elements, such as an O-ring 38 shown in FIG. 3. For use in a liquid flow application, by way by of example only, a first spacer or locator 36 is mounted within the inner bore 33 of the expanded end portion 30 and seats on the inner shoulder 34. Next, the first seal member, such as O-ring 38, is also mounted in the inner bore 33 of the expanded end portion 30 followed by a spacer 40, an optional second seal element or O-ring 42, and a final axially outermost locator or top hat 44. A vapor application can use the same or fewer seal and spacer elements, such as one O-ring 38, one top hat 44 and one or two spacers 36 and 40.

As is conventional, the various spacers and seal elements 36, 38, 40, 42, and 44 are coaxially mounted within the inner bore 33 of the expanded end portion 30 and extend axially outward toward the end 32 from the inner shoulder 34. The seal elements 38 and 42 form a seal between the end of the first and second endforms 12 and 14.

A connector body or retainer 50 is provided and formed of a suitable plastic, such as a glass filled nylon or other suitable material. The following example of a retainer 50 will be understood to be by way of example only as any conventional retainer may be employed in the present invention. Although cost advantages are obviously available by providing the connector body and retainer 50 as a one-piece, unitary structure, the present invention also contemplates a more conventional two-part connector formed of a housing portion joined to the second tube member endform 14 and a retainer releasably joinable to the housing and interlocked with the first tube member endform 12 in the housing.

Figure 5:
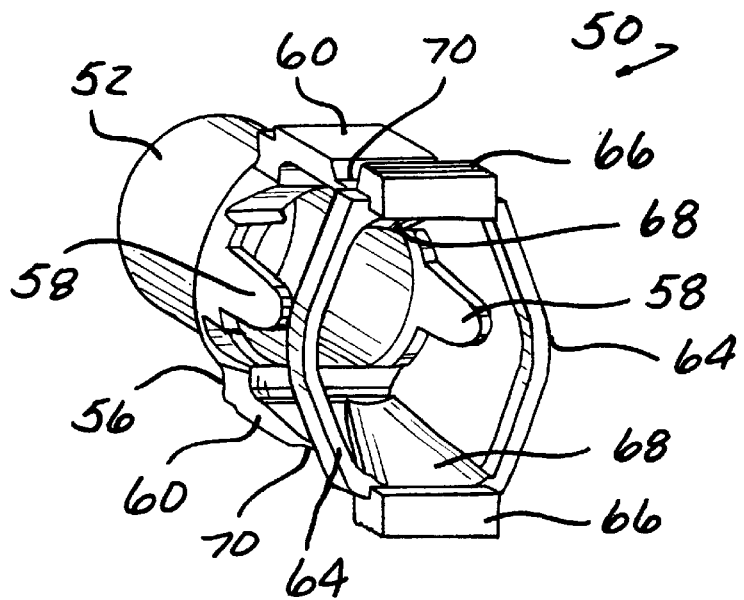

As shown in FIG. 5, the retainer 50 includes a generally cylindrical sleeve 52 having an internal bore 54. The sleeve 52 is sized to fit within the inner diameter or the bore 33 in the first tube member endform 12 as shown in FIG. 3. A flange portion 56 projects radially outward from one end of the sleeve 52. The flange 56, as shown in FIGS. 3 and 4, defines a generally annular seating surface engagable with the one end 32 of the first tube member endform 12. A pair of axially extending, diametrically opposed guide arms 58 project from the flange 56. Likewise, a pair of diametrically opposed mounting arms 60 project from the flange 56 and are interposed between the guide arms 58.

A retainer finger portion or ring 64 in the form of two annular members is disposed between and interconnected with a pair of finger engagable pads 66 which are circumferentially spaced on opposite sides of the ring 64.

In the present aspect of the invention, the two ring sections 64 are arcuately formed and bent axially inward at a center point toward the guide arms 58 so as to constitute a squeeze-to-release retainer. Radially inward projecting latch members or fingers 68 project from an inner surface of each of the finger pads 66. An inner end of each finger 68 is spaced from the flange 56 to define an opening in which the annular flange 16 on the second tube member endform 14 is interlockingly disposed when the second tube member endform 14 is mounted through the retainer 50 into the bore 33 in the first tube member endform 12.

A pair of living hinges 70 in the form of thin molded portions interconnect each mounting arm 60 with the ring section 64 to enable the pads 66 to be squeezed together to disengage the fingers 68 from the flange 16 on the second tube member endform 14.

In constructing the quick connector apparatus 10 of the present invention, the seal elements, whether constituting a single seal element or O-ring 38 or the additional locators and seal element 36, 40, 42, and 44 are individually premounted into the expanded or enlarged portion 30 of the first tube member endform 12. The cylindrical sleeve 52 of the retainer 50 is then inserted into the bore 33 of the first tube member endform 12. The cylindrical sleeve 52 may have a length to cause the flange 56 seat against the shoulder 34.

Further, as shown in FIG. 4, in the preferred mounting arrangement, the end 32 of the first tube member endform 12 seats against the flange 56 on the retainer 50 to firmly hold in place the locator 44 as well as the other seal and locator elements 36, 38, 40, and 42 mounted in the bore 33 of the expanded portion 30.

In a preferred aspect of the invention, the retainer 50 and the first tube member endform 12 are sealingly and fixedly interconnected via a spin welding process. The various control parameters in spin welding processes are generally well known and for sake of brevity they will not be repeated herein. Reference may be had to U.S. Pat. Nos. 2,933,428; 3,980,248 and 5,152,855, the relative portions therein pertaining to control parameters in spin welding are incorporated herein by reference.

With the end 52 of the first tube member endform 12 pressed into engagement with the flange 56 on the retainer 50, either the first tube member endform 12 or the retainer 50 is held in a fixed position and the other of the retainer 50 or the first tube member endform 12 is rotated at a high speed in a suitable press. Once a suitable speed differential is established, friction between the inner surface of the bore 33 in the expanded portion 30 of the first tube member endform 12 and the outer surface of the cylindrical sleeve 52 and the facing surface of the flange 56 on the retainer 50 causes melting of the adjacent surfaces to create weldment zones. The respective materials co-mingle and quickly reharden to establish continuous, concentric weld zones for sealing the first tube member endform 12 to the cylindrical sleeve 52 and the flange 56 of the retainer 50.

It is further preferred that during the spin welding process, the retainer 50 and the first tube member endform 12 be urged toward each other. This forces the bore 33 of the first tube member endform 12 into engagement with the flange 56 and the outer surface of the sleeve 52 on the retainer 50. The retainer 50 can be formed of a suitable material with sufficient carbon content or other material to ensure a degree of electrical conductivity sufficient to permit a discharge of static charges in the interior layer 26 generated by the flow of fluid through the first tube member endform 12.

In use in an automobile, the second tube member endform 14 is inserted through the ring 64 and the bore 54 in the sleeve 52 of the retainer 50 into the bore 33 in the expanded portion 30 of the first tube member endform 12. During this insertion, the enlarged annular flange 16 on the second tube member endform 14 strikes and urges the fingers 68 on the retainer 50 radially outward until the flange 16 passes the inner ends of the fingers 68. The fingers 68 then snap back into position behind the flange 16 to fixedly trap the flange 16 between the inner ends of the fingers 68 and the flange 56 on the retainer 50. It should be noted that the single or multiple seal elements 36 and 40 mounted within the expanded portion 30 of the first tube member endform 12 sealingly join the end of the second tube member endform 14 to the first tube member endform 12 at the inner surface of the expanded portion 30 of the first tube member endform 12.

It should be noted that this configuration places the seals 38 and 42 axially in front of the spin weld joint to reduce the possibility of vapor or fuel leakage.

According to this aspect of the invention, a retainer element 80, formed substantially identical to the retainer element 50 described above and shown in FIGS. 3–5, but with several modifications, is spin welded to one end of the first tube endform 12. The retainer 80 also functions to releasably join the second tube endform 14 to the first tube endform 12.

In this aspect, the retainer element 50 includes a generally annular, cylindrical flange portion 82 which has an inner bore 84 sized to slidably receive one end of the second tube endform 14.

Preferably, the cylindrical sleeve 82 is formed with a first radially inner flange 86 and a second, radially outer flange 88. The inner flange 86 extends axially further outward from the latch member 68 than does the second radially outer flange 88. The inner and outer flanges 86 and 88 are preferably circular in cross section and concentric with the bore 84.

Figure 6:
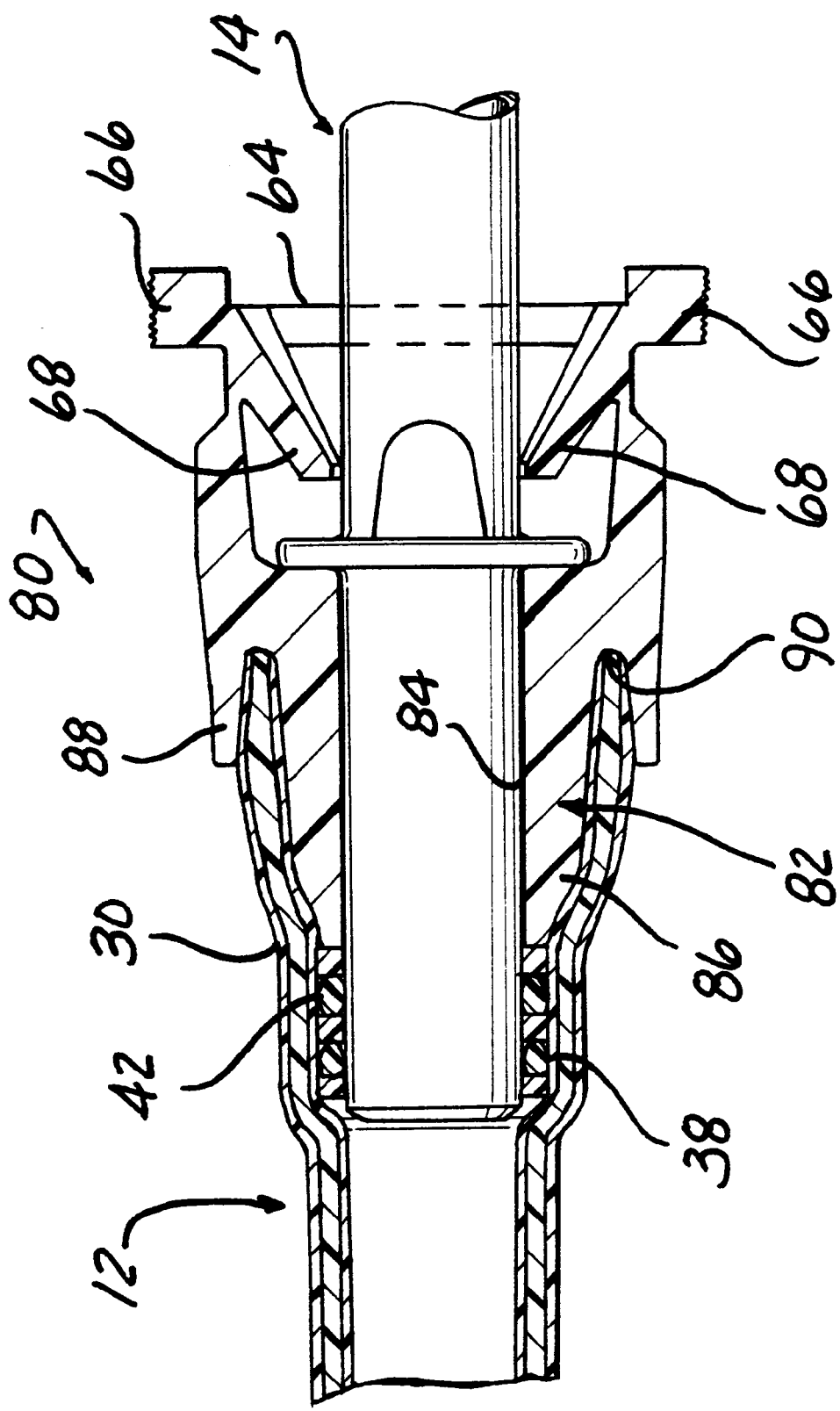
FIG. 6 is a side elevational, cross sectional view of the assembled quick connector according to another aspect of the present invention.

An annular, open ended groove 90 is formed between the inner and outer flanges 86 and 88 as shown in FIG. 6. The annular groove 90 may be formed by at least one and preferably two different angled, converging tapered portions extending from the outer axial end of the outer flange 88 to the inner end of the groove 90. The tapered portions may be formed as described in co-pending application Ser. No. 08/874,755, the entire contents of which are incorporated herein by reference.

In constructing this aspect of the present invention, the first tube endform 12 is initially pre-positioned concentrically with the open end of the groove 90 and is spaced slightly axially therefrom. The nominal inner diameter of the first tube endform 12 is slightly greater than the maximum diameter of the leading nose or end of the radially outer flange 88 to ensure that the first tube end form 12 contacts the retainer element 80 to preposition and self-center the two elements.

The tube is preferably rigidly mounted and the retainer element 80 mounted for relative rotation. Once a suitable speed differential is established, the first tube endform 12 and the retainer element 80 are axially pressed together such that the leading edge or end of the first tube endform 12 contacts the tapered portion of the groove 90 which tends to flare the first tube endform 12 as it moves axially with respect to the retainer element 80.

During the spin welding process, the outer surface of the first tube endform 12 frictionally engages the tapered portion of the groove 90 to melt the surfaces thereof and to establish an outer weldment zone therebetween. Likewise, the inner surface of the inner layer of the first tube endform 12 frictionally engages the tapered portions of the inner flange 86 to melt the respective portions thereof to create an inner weldment zone between the inner flange 86 and the first tube endform 12. The respective materials co-mingle and quickly harden to establish continuous concentric weldments thereby hermetically sealing the intermediate portion of the leading edge of the first tube endform 12 in the groove 90 in the retainer element 80. This ensures that fluids being carried in the host system as well as external atmospheric contaminates are never exposed to the bonding or intermediate layer of the first tube endform 12.

Flash traps, as described in the above referenced co-pending application, may be formed in the retainer element 80 at the inner ends of the groove 90 to trap any excess material or flash which is created during the spin welding process. This prevents excess flash from extending radially inward into the bore 84 to obstruct the flow of fluid therethrough. Likewise, the radially outer flash trap receives flash created during the spin welding process and prevents the flash from being externally visible.

Aside from the inclusion of the groove 90 for reciving the end of the first tube endform 12 during the spin welding process, the function of the retainer element 80 is identical to that of the retainer element 50 described above in that the axially outer end of the inner flange 86 contacts and maintains the various spacer and seal elements within the bore in the enlarged portion 30 of the first tube endform 12.

What is claimed is:

1. A method of joining a first flexible elongated tube having a substantially constant nominal inner diameter and a second tube endform, the second tube endform having a radially enlarged flange, the method comprising the steps of:

enlarging one end of the first tube to form an end bore having a longitudinally extending inner surface with an inner diameter greater than the nominal inner diameter of the first tube;

inserting a seal element into a bore of the end first tube;

providing a retainer element with a through bore extending between opposed ends, at least one latch member unitarily extending from one end and an elongated, axially extending outer surface carried at an other end;

disposing the other end of the retainer element in the end bore of the first tube;

welding the longitudinally extending inner surface of the first tube to the axially ending outer surface of the retainer element; and, inserting the second tube endform into the first tube endform through the bore in the retainer element until the latch member on the retainer element engages the radially enlarged flange on the second tube endform to couple the second tube endform to the first tube.

2. The method of claim 1 further comprising the step of:

disposing at least one spacer in the end bore of the first tube coaxially with the seal element.

3. The method of claim 2 further comprising the steps of:

disposing a pair of spacers on opposite sides of the seal element in the end bore of the first tube; and mounting a second seal element coaxially with one of the spacers in the end bore of the first tube.

4. The method of claim 1 wherein:

the step of welding the first tube to the retainer element takes place after the seal element is disposed in the end bore of the first tube.

5. The method of claim 1 further comprising the steps of:

forming a flange on the retainer element adjacent to the cylindrical sleeve, the flange abutting one end of the first tube.

6. The method of claim 5 wherein:

the step of welding the first tube to the retainer element comprises spin welding an end of the first tube to the flange on the retainer element.

7. The method of claim 1 further comprising the step of:

forming inner and outer seals between the retainer element and the first tube by a seal element and a spin weld formed between the enlarged end of the first tube and the retainer element.

8. A fluid connector apparatus for sealingly joining an elongated flexible first conduit having a nominal inner diameter and a second conduit having an enlarged annular flange adjacent one end, the fluid connector comprising:

the first conduit having an expanded first end with an end bore extending from the first end having an inner diameter greater than the nominal inner diameter of the first conduit;

a seal member mounted in the end bore of the first conduit;

a retainer element having a through bore extending between first and second opposed ends and at least one latch member extending from the second end, the first end of the retainer element having an elongated, axially extending surface spun welded to the first end of the first conduit;

a sleeve carried on one end of the retainer element, the sleeve carrying the elongated, axially extending surface insertable into a bore formed in the end portion of the first conduit, the sleeve has a length such that one end of the sleeve retains the seal element in the end portion of the first conduit; and the second conduit releasably coupled by the retainer element to the first conduit.

9. The fluid connector apparatus of claim 8 further comprising:

at least one spacer mounted in the first end of the first conduit coaxial with the seal element.

10. The fluid connector apparatus of claim 8 further comprising:

a pair of spacers disposed coaxially on opposite sides of the seal element in the first conduit; and a second seal element coaxially disposed in the first conduit adjacent to one of the spacers.

11. The fluid connector apparatus of claim 8 further comprising:

a flange formed on the retainer element adjacent to the cylindrical sleeve, the flange engagable with one end of the first conduit and spin welded to the first conduit.

12. The fluid connector apparatus of claim 8 wherein:

the seal member and the spin weld between the retainer element and the first conduit form inner and outer seals between the first and second conduits.

\* \* \* \* \*